United States Patent Office 3,829,395
Patented Aug. 13, 1974

3,829,395
CORROSION RESISTANT PRIMER COMPOSITION CONTAINING ZINC BORATE PIGMENT
Gerald W. Goodell, Flint, Mich., assignor to E. I. du Pont de Nemours and Company, Wilmington, Del.
No Drawing. Filed June 28, 1972, Ser. No. 267,074
Int. Cl. C09d 3/48, 5/08, 5/12
U.S. Cl. 260—22 A
7 Claims

ABSTRACT OF THE DISCLOSURE

The corrosion resistant primer composition is a non-polluting primer that utilizes zinc borate as a corrosion inhibitive pigment and as a film-forming binder an alkyd resin, an epoxy resin, an epoxy ester resin, an acrylic resin, a polyurethane, an oleoresinous product or a phenolic product is utilized; the primer is particularly useful for automobiles, trucks and appliances which require a high degree of corrosion protection.

BACKGROUND OF THE INVENTION

This invention relates to a coating composition and in particular to a corrosion resistant primer composition.

Primer compositions are well known in the art as shown by Evans et al. U.S. Pat. 2,847,323, issued Aug. 12, 1958; Barrett U.S. Pat. 3,873,210, issued Feb. 10, 1959 and Swanson U.S. Pat. 3,136,653, issued June 9, 1964. These primer compositions are excellent for many uses and provide the good corrosion resistance to metals. However, these primer compositions utilize zinc chromate, lead chromate, lead silico chromate, lead oxide, basic lead silicate and calcium plumbate as corrosion inhibitive pigments which are known to present pollution and environmental problems. Since lead is toxic and the chromates can cause respiratory problems, application and sanding of these finishes must be done under controlled conditions to protect the worker.

The novel primer composition of this invention utilizes zinc borate pigment as a corrosion inhibitive pigment to provide a high quality primer composition particularly useful for automobile and truck bodies that is non-toxic and can be applied by conventional techniques.

SUMMARY OF THE INVENTION

The improved primer composition of the invention comprises 10–50% by weight of the film-forming binder and corresponding 90–50% by weight of the solvent for the film-forming binder in which the film-forming binder is either an alkyd resin, an epoxy resin, an epoxy ester resin, an acrylic resin, a urethane resin, an oleoresinous product or a phenolic resin and optionally contains crosslinking agents for these resins; the improvement comprises the use of zinc borate pigment of the approximate formula $$(ZnO) \cdot (B_2O_3) \cdot (H_2O)$$

wherein (ZnO) comprises 30–60% by weight of the pigment, ($B_2O_3$) comprises 26–50% by weight of the pigment, and ($H_2O$) comprises 14–26% by weight of the pigment; and the zinc borate pigment is utilized in a pigment to binder ratio of 5:100 to about 200:100.

DESCRIPTION OF THE INVENTION

The novel primer composition of this invention has a binder solids content of 10–50% by weight but preferably 20–40% by weight binder is used. A novel composition contains zinc borate pigment and can contain other pigments or colorants and has a zinc borate pigment to binder ratio of about 5:100 to about 200:100 and preferably a zinc borate pigment to binder ratio of 100:200 is utilized.

The binder utilized in the novel primer composition of this invention can be an alkyd resin, an epoxy resin, an epoxy ester resin, a urethane resin, an oleoresinous product, a phenolic resin or an acrylic resin. When applicable conventional cross-linking agents can also be utilized with the resins. The zinc borate pigment and other pigments used in the novel composition are dispersed in a solution of one of the aforementioned resins by conventional techniques, such as sand-grinding, ball-milling and the like to form a mill base. The mill base is then blended with a solution of one of the aforementioned resins to form a novel coating composition of this invention. The composition may be further reduced with conventional solvents and thinners to achieve the desired application viscosity.

The borate pigment utilized in the novel coating composition of this invention has the preferred formula $$2ZnO \cdot 3B_2O_3 \cdot (H_2O)_x$$

in which the water of hydration, $x$, is present in the range of $3.3H_2O$ to $3.7H_2O$. Preferably, using borate pigment is utilized in which the water of hydration is about $3.5H_2O$.

The alkyd resin that can be used in the novel coating composition of this invention is of a drying oil, an ester of an organic dicarboxylic acid constituent and a polyol and can contain up to 10% by weight of an ester of an aromatic monocarboxylic acid and a polyol and can contain up to 8% by weight of excess polyol. Preferably, the alkyd resin contains 35–65% by weight of a drying oil, 32–50% by weight of an ester of a polyol and an aromatic dicarboxylic acid, 2–9% by weight of an ester of an aromatic mono-carboxylic acid and a polyol and 2–5% by weight of excess polyol.

The alkyd resin is prepared by conventional techniques in which the constituents are charged into a reaction vessel along with an esterification catalyst and, preferably, a solvent, and heated to about 80–200° C. for about 0.5–6 hours. Water is removed as the constituents are esterified. The resulting alkyd resin should have an acid number less than 30, and preferably, less than 15.

The following drying oils are used to prepare the alkyd resin: tung oil, tall oil, linseed oil, dehydrated castor oil, soya oil, chinawood oil and mixtures of these drying oils.

Any of the following acids or anhydrides or mixtures thereof are used to prepare the alkyd resin: maleic acid, maleic anhydride, phthalic acid, phthalic anhydride, isophthalic acid, terephthalic acid, succinic acid, glutaric acid, adipic acid, pimelic acid, suberic acid, azelaic acid and sebacic acid.

The polyol used to prepare the alkyd resin is one of the following: glycerol, ethylene glycol, propylene glycol, diethylene glycol, butane diol, trimethylol propane, trimethylol ethane, pentaerythritol, sorbitol, mannitol or mixtures of these polyols.

The following aromatic mono-carboxylic acids can be used to prepare the alkyd resin: benzoic acid, paratertiary butylbenzoic acid, phenol acetic acid, triethyl benzoic acid and the like.

The following are preferred alkyd resins used in the novel coating composition of this invention:

a soya oil alkyd resin containing soya oil, glycerol phthalate and excess glycerine;
a bodied linseed oil alkyd resin of linseed oil, glycerol phthalate and excess glycerine.

The epoxy resin utilized in this invention has a repeating structural formula

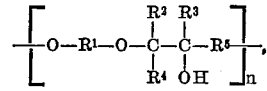

wherein $n$ is an integer sufficient to provide the epoxy resin with a molecular weight of at least about 500 and up to about 4,000, $R^1$ is a divalent aromatic radical; $R^2$, $R^3$ and $R^4$ are individually selected from the group of hydrogen and an alkyl group having 1–5 carbon atoms, $R^5$ is an alkylene group having 1–5 carbon atoms, $R^1$ as shown above, can be a bisphenol A or a bisphenol F, both of which can be substituted. Bisphenol A is para, para-isopropylidene diphenol and bisphenol F is 4,4'-dihydroxydiphenyl methane. Suitable substituents for these compounds include alkyls having 1–5 carbon atoms, halogens, such as chlorine, bromine and fluorine, and alkoxy groups having 1–5 carbon atoms.

One preferred epoxy resin is the reaction product of epichlorohydrin and bisphenol A which has the repeating structural formula

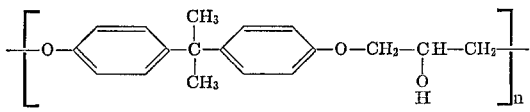

where $n$ is the same as above. Epichlorohydrin and bisphenol A polymer is preferred because it readily forms coatings which have a balance of desired physical properties, such as high tensile strength, excellent solvent resistance and excellent adhesion to substrates and to acrylic lacquers or enamel topcoats.

Another very useful epoxy resin is the reaction product of epichlorohydrin and bisphenol F which has the repeating structural formula

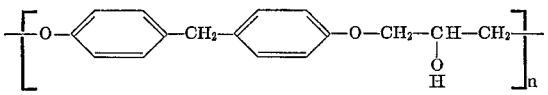

where $n$ is as defined above.

Epoxy ester resins can be utilized in preparing the novel coating composition of this invention. These epoxy ester resins are the esterification product of one of the above epoxy resins and a dicarboxylic acid.

The dicarboxylic acid used to prepare the epoxy ester resin is of the general formula

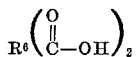

where $R^6$ is a divalent organic radical. Also, blends of dicarboxylic acids and anhydrides of dicarboxylic acids can be utilized. Typical dicarboxylic acids that can be used to prepare the polymer are, for example, aromatic dicarboxylic acids, aliphatic dicarboxylic acids, alicyclic dicarboxylic acids, or a mixture of any of these acids and anhydrides of these acids. Typical saturated aliphatic dicarboxylic acids are succinic, glutaric, adipic, pimelic, suberic, azelaic, brassic, dodecanedoic and the like; alicyclic dicarboxylic acids are, for example, hexahydroterephthalic acid, tetrahydroisophthalic acid, tetrahydroterephthalic acid, hexahydrophthalic acid, tetrahydrophthalic acid; typical aromatic dicarboxylic acids are isophthalic acid, terephthalic acid, 1,5-naphthalene dicarboxylic acid, 2,2'-dibenzoic dicarboxylic acid, 2,2'-isopropylidenedibenzoic acid, 2,2'-ketodibenzoic acid, oxydibenzoic acid, 2,2'-sulfondibenzoic acid, and the like.

Up to 15% by weight monobasic acids can be utilized in preparing the epoxy ester, such as benzoic acid, acetic acid, propionic acid, caproic acid, pelargonic acid, lauric acid, palmetic acid, stearic acid and the like. Also, drying oil fatty acids, tung oil, tall oil, linseed oil, soya oil dehydrated castor oil, can also be utilized in preparing the epoxy ester resin.

One preferred polyepoxy ester resin is an esterification product of an epoxy resin of epichlorohydrin and bisphenol A and tall oil fatty acids.

The urethane resins that can be utilized in this invention are of an organic diisocyanate and a hydroxyl terminated polyester or polyalkylene ether glycol. These urethane resins can be chain-extended diamines or glycols.

Aromatic, aliphatic and cycloaliphatic diisocyanates can be used to prepare the polyurethanes such as tolylene-2,4- and 2,6-diisocyanate, in phenylene diisocyanate, ethylene diisocyanate, propylene diisocyanate, hexamethylene diisocyanate, cyclohexylene diisocyanate, methylene-bis-(4-cyclohexyl isocyanate), ethylene-bis-(4-cyclohexyl isocyanate), propylene-bis-(4-cyclohexyl isocyanate) and the like.

Poly(alkyleneether) glycols having 2–12 carbon atoms in the alkylene segment and a molecular weight of 300–5000 can be used to prepare the polyurethane. Typical are polyethyleneether glycol, polypropyleneether glycol, polytetramethyleneether glycol, polyhexamethyleneether glycol, polydecamethyleneether glycol, polydedecamethyleneether glycol and mixtures thereof.

Polyester glycols having a molecular weight of 300 to 5000 can also be used to form the polyurethane. Typical dicarboxylic acids that can be used to prepare the polyester are malonic acid, succinic acid, glutaric acid, adipic acid, pimelic acid, suberic acid, azelaic acid, sebacic acid and the like; phthalic acid, isophthalic acid, terephthalic acid, uvitic acid. Typical glycols are ethylene glycol, propylene glycol, butane diol, pentamethylene diol, pentaerythritol and the like.

Typical chain-extenders that can be used are hydrazine, mono-substituted hydrazines, ethylene diamine, 1,4-cyclohexane-bis-(methylamine), piperazine and the like.

Oleoresinous products which are the reaction products of wood rosin and a monohydric or polyhydric alcohol, or alkylated phenol can also be used. One example is the pentaerythritol ester of rosin which is largely pentaerythritol tetrabietate.

Phenolic resins can also be used. These resins are a blend of phenol formaldehyde and drying oils such as linseed oil, tung oil, soya oil and the like and may be modified with rosins.

The acrylic polymer that can be utilized in the novel primer composition of this invention comprises an alkyl methacrylate or styrene, an alkyl acrylate, optionally an hydroxy alkyl acrylate or a hydroxy alkyl methacrylate and an $\alpha,\beta$-ethylenically unsaturated monocarboxylic acid.

The acrylic polymer can be prepared by conventional solution polymerization techniques in which the monomer constituents are blended with a solvent in polymerization catalyst in a reaction mixture is heated to 55–150° C. for about 2–6 hours to form a polymer.

Typical solvents which can be used to prepare the acrylic polymer are toluene, xylene, ethyl acetate, acetone, methyl isobutyl ketone, methyl ethyl ketone, ethyl alcohol, and other aliphatic, cycloaliphatic and aromatic hydrocarbons, esters, ethers, ketones, and alcohols such as are conventionally used.

About 0.1–4% by weight based on the weight of the monomers of a polymerization catalyst is used to prepare the acrylic polymer. Typical catalystst are azo-bis($\alpha$,gamma dimethyl valeronitrile), t-butyl, peroxy pivalate, azobisisobutyronitrile and the like.

Typical alkyl acrylates and alkyl methacrylate having 1–12 carbons in each alkyl group can be used to prepare the acrylic polymer and are ethyl acrylate, propyl acrylate, isopropyl acrylate, butyl acrylate, isobutyl acrylate, hexylacrylate, 2-ethylhexyl acrylate, nonyl acrylate, and n-lauryl acrylate, methyl methacrylate, ethyl methacrylate, propyl methacrylate, butyl methacrylate, hexyl methacrylate, 2-ethylhexyl methacrylate, nonyl methacrylate, and lauryl methacrylate and the like.

Optionally, hydroxy alkyl acrylates or methacrylates having 2–4 carbon atoms in the alkyl group can be used to prepare the acrylic polymer such as 2-hydroxy ethyl acrylate, 2-hydroxy propyl acrylate, 2-hydroxy butyl acrylate, 2-hydroxy propyl methacrylate, 2-hydroxy butyl methacrylate and the like.

0.1–5% by weight of the ethylenically unsaturated carboxylic acids can be used in the acrylic polymer such as acrylic acid, methacrylic acid, itaconic acid, crotonic acid and the like.

Optionally, cross-linking agents can be utilized in the novel primer composition of this invention such as melamine formaldehyde, alkylated melamine formaldehyde resins, benzoguanamine resins, urea formaldehyde resins. Generally about 2–30% by weight, based on the weight of the film-forming constituents, of the cross-linking agent is utilized.

One particularly useful group of cross-linking agents are the alkylated melamine formaldehyde resins having 1–4 carbon atoms in the alkyl group. These alkylated melamine formaldehyde resins are those that are conventionally known in the art and are prepared by conventional techniques in which a lower alkyl alcohol such as methanol, ethanol, butanol, isobutanol, propanol, isopropanol and the like is reacted with the melamine formaldehyde to provide pendant alkoxy groups. One particularly useful resin of this type is hexa(methoxymethyl)melamine.

A variety of polyisocyanates can also be utilized as cross-linking agents. One particularly preferred isocyanate has the general formula of

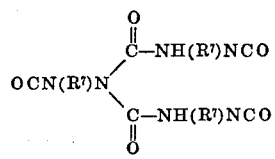

wherein $R^7$ is an alkyl group having 1–12 carbon atoms. One preferred polyisocyanate is a biuret of hexamethylene diisocyanate and has the above structure in which $R^7$ is a saturate straight chain hydrocarbon group having 6 carbon atoms. These biurets are prepared according to the process described in Mayer et al. U.S. Pat. 3,245,941, issued Apr. 12, 1966.

Other polyisocyanates include aromatic diisocyanates, aliphatic diisocyanates, cycloaliphatic diisocyanates, heterocyclic diisocyanates and the like.

The novel primer composition of this invention in addition to the zinc borate pigment can contain other pigments, such as carbon black, extender pigments such as silica, and china clay; titanium dioxide, iron oxide and the like and other dyes and colorants.

Plasticizers can be used in the novel coating composition of this invention in amounts up to 10% by weight of the binder. Polymeric plasticizers which can be used are epoxidized soya bean oil, oil free and oil modified alkyds and polyesters, such as polyorthophthalate esters, polyalkylene adipate esters or polyarylene adipate esters. Monomeric plasticizers that can used are butylbenzyl phthalate, dibutyl phthalate, triphenyl phosphate, 2-ethylhexylbenzyl phthalate, dicyclohexyl phthalate, dibenzyl phthalate butylcyclohexyl phthalate, mixed benzoic acid and fatty oil acid esters of pentaerythritol, poly(propylene adipate)dibenzoate, diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide, the di-2-ethylhexyl ester of hexamethylene diphthalate, di(methylcyclohexyl)phthalate.

Up to 20% by weight, based on the weight of the binder, of cellulose acetate butyrate can be used in the novel coating composition. The cellulose acetate butyrate preferably has a butyryl content of about 45–55% by weight and a viscosity of 0.1–6 seconds determined at 25° C. according to ASTM D–1343–56.

The composition can be diluted to an application viscosity with any of the conventional solvents and thinners and can be applied by conventional techniques, such as brushing, spraying, electrostatic spraying, flow coating, dip coating, roller coating and the like. By choosing the desirable solvents and by varying the ratio of the solvents, the novel composition can be provided with the physical properties required for the aforementioned application methods. The resulting finish is then air dried or can be force dried at about 100–150° C.

The following Examples illustrate the invention. The parts and percentages are on a weight basis unless otherwise specified.

EXAMPLE 1

| Portion 1: | Parts by weight |
|---|---|
| Soya alkyd resin solution (55% solids in an aromatic hydrocarbon solvent, of a resin of 43% soya oil, 52% glycerol phthalate, 5% excess glycerine and having an acid No. of 6 and a Gardner-Holdt viscosity at 25° C. of Z) | 255.0 |
| Soya lecithin | 14.5 |
| Cresol | 2.5 |
| Mineral spirits | 389.0 |
| "Bentone" 34 (Montmorillonite clay pigment) | 10.0 |
| Calcium carbonate pigment | 1789.0 |
| Iron oxide pigment | 465.0 |
| Zinc borate pigment ($2ZnO \cdot 3B_2O_3 \cdot 3 \cdot 5H_2O$) | 77.0 |
| Portion 2: | |
| Toluene | 85.0 |
| Total | 3087.0 |

Portion 1 is premixed and charged into a ball mill and ground for 48 hours and then portion 2 is added and ground for an additional hour. The pigment dispersion is removed from the mill.

A primer composition then is prepared by blending together the following ingredients:

| | |
|---|---|
| Pigment dispersion (prepared above) | 687 |
| Soya alkyd resin solution (described above) | 1 |
| Soya alkyd resin solution (60% solids in mineral spirits, of a resin of 52% soya oil, 45.6% glycerol phthalate, 2.4% excess glycerine, acid No. 3.5 and a Gardner-Holdt viscosity at 25° C. of Z) | 333 |
| Urea formaldehyde resin solution (60% solids of urea formaldehyde resin having a viscosity of 1500–3000 centipoises in butyl alcohol) | 44 |
| Aromatic hydrocarbon solvent | 109 |
| Total | 1174 |

The resulting primer has a viscosity of 28 seconds measured in a No. 10 Parlin cup at 25° C. The primer is reduced to 15% solids with xylene and sprayed onto two sets of steel panels. One set of steel panels is treated with "Bonderite" No. 40 (zinc phosphate) and the second set of panels are baked at 150° C. for 30 minutes giving a primer finish about 1.2 mils thick.

The finish on the panels is then scribed through to the metal and the panels are subjected to a standard salt spray test for 168 hours and each set of panels provided acceptable corrosion resistance 5% of the panels failed that were treated with Bonderite and 10% of the panels failed in which the steel was untreated.

An identical primer composition is formulated except zinc chromate pigment is substituted for the zinc borate pigment. Zinc chromate is a pigment which is conventionally used in primers for corrosion resistance. This primer composition is sprayed onto two sets of steel panels and baked as above to provide a 1.2 mil finish. One set of panels is treated with Bonderite No. 40 and the second set of panels is clean but untreated steel. Salt spray corrosion test results are similar to those obtained with the zinc borate pigmented primer composition.

EXAMPLE 2

A pigment dispersion is prepared as follows:

| Portion 1: | Parts by weight |
|---|---|
| Bodied linseed oil alkyd resin solution (56% solids in xylene of a resin of 43% linseed oil, 52% glycerol phthalate and 5% excess glycerine having an acid No. of 7–13 and a Gardner-Holdt viscosity at 25° C. of Z) | 250 |
| Xylene | 744 |
| Calcium carbonate pigment | 836 |
| Finely divided talc | 307 |
| Zinc borate pigment (described in Example 1) | 863 |
| Portion 2: | |
| Bodied linseed oil alkyd resin (described above) | 269 |
| Xylene | 65 |
| Total | 3334 |

Portion 1 is premixed and charged into a ball mill and ground 30 hours. Portion 2 is then added and ground for 1 hour and the dispersion is removed from the mill.

A primer composition is then formulated by blending together the following ingredients:

| | Parts by weight |
|---|---|
| Pigment dispersion (prepared above) | 900.0 |
| Bodied linseed oil alkyd resin solution (described above) | 538.0 |
| Cobalt naphthenate drier solution (6% cobalt) | 3.0 |
| Butraldoxime | 3.6 |
| Xylene | 382.0 |
| Black pigment dispersion (12.9% dispersed carbon black pigment, 47.0% soya oil alkyd resin solution described in Example 1 and 40.1% mineral spirits) | 9.0 |
| Total | 1835.6 |

The resulting primer has a viscosity of 22 seconds measured in a No. 10 Parlin cup at 25° C. The primer is reduced to 25% solids with xylene and then sprayed onto clean steel panels and Bonderite No. 40 treated steel panels and baked for 30 minutes at 150° C. to provide a finish about 1.2 mils thick. The panels are subjected to a standard salt spray test as in Example 1 and the panels provided acceptable corrosion resistance.

EXAMPLE 3

A pigment dispersion is prepared as follows:

| Portion 1: | Parts by weight |
|---|---|
| Soya alkyd resin (60% solids in an aromatic hydrocarbon solvent of a resin of 41% soya oil, 54% glycerol phthalate and 5% excess glycerine having an acid No. of 11 and a Gardner-Holdt viscosity of Z) | 387 |
| Inhibitor solution (10% cresol in a 12/1 solvent blend of mineral spirits and xylene) | 22 |
| Zinc borate pigment (described in Example 1) | 42 |
| Mineral spirits | 751 |
| Calcium carbonate pigment | 1683 |
| Carbon black pigment | 91 |
| Portion 2: | |
| Soya alkyd resin (described above) | 109 |
| Mineral spirits | 156 |
| Hydrocarbon solvent—having a boiling point of 182–219° C. | 69 |
| Total | 3310 |

Portion 1 is premixed and charged into a ball mill and ground for 35 hours. Portion 2 is then added and ground for 1 hour and the dispersion is removed from the mill.

A primer composition is then formulated by blending together the following ingredients:

| | Parts by weight |
|---|---|
| Pigment dispersion (prepared above) | 624 |
| Soya alkyd resin (described above) | 240 |
| Mineral spirits | 111 |
| Total | 975 |

The resulting primer has a viscosity of 22 seconds measured in a No. 10 Parlin cup viscosity at 25° C. The primer is reduced to 25% solids with xylene and then sprayed onto clean steel panels and Bonderite No. 40 treated steel panels and baked for 30 minutes at 150° C. to provide a finish about 1.2 mils thick. The panels are subjected to a standard salt spray test as in Example 1 and the panels provided acceptable corrosion resistance.

What is claimed is:

1. A primer composition comprising 10–50% by weight of a film-forming binder and 90–50% by weight of a solvent for the film-forming binder; wherein the film-forming binder is selected from the group consisting of a soya oil alkyd resin and a bodied linseed oil alkyd resin and containing zinc borate pigment of the formula $$2ZnO \cdot 3B_2O_3 \cdot (H_2O)_x$$

wherein $x$ is from 3.3 to 3.7 in a zinc borate pigment to binder ratio of 5:100 to about 200:100.

2. The primer composition of Claim 1 in which the zinc borate pigment has the formula $$2ZnO \cdot 3B_2O_3(H_2O)_{3.5}.$$

3. The primer composition of Claim 2 in which the film-forming binder is a soya oil alkyd resin.

4. The primer composition of Claim 3 in which the soya oil alkyd resin is of soya oil, glycerol phthalate and excess glycerine.

5. The primer composition of Claim 2 in which the film-forming binder is a bodied linseed oil alkyd resin.

6. The primer composition of Claim 5 in which the film-forming binder of the alkyd resin is of linseed oil, glycerol phthalate and excess glycerine.

7. A metal substrate coated with a dried coalesced layer of the primer composition of Claim 1.

References Cited

UNITED STATES PATENTS

| 2,405,366 | 8/1946 | Myhren et al. | 423—280 |
| 3,549,316 | 12/1970 | Nies et al. | 423—280 |
| 2,785,144 | 3/1957 | Wachter | 260—29.3 |
| 3,179,608 | 4/1965 | Broadhead | 260—22 A |
| 3,380,836 | 4/1968 | Robinson | 260—22 A |
| 3,385,819 | 5/1968 | Gouinlock | 260—45.7 R |

OTHER REFERENCES

Chemical Abstracts, vol. 63, No. 4, Aug. 16, 1965, p. 4509e.

The Condensed Chemical Dictionary, 7th ed., Reinhold Publishing Company, 1966, p. 1032.

Zimmit, Def. Pub. search copy of Ser. No. 753,705, filed Aug. 19, 1968, published in 866 O.G. 1437 on Sept. 30, 1969, No. T866,025.

DONALD E. CZAJA, Primary Examiner

R. W. GRIFFIN, Assistant Examiner

U.S. Cl. X.R.

117—75, 132 B, 132 BE, 132 BF, 161 K, 161 L, 161 ZB, DIG. 10; 260—13, 18 EP, 19 R, 37 R, 37 EP, 41